US009594751B1

(12) United States Patent
Gill et al.

(10) Patent No.: US 9,594,751 B1
(45) Date of Patent: Mar. 14, 2017

(54) PREDICTIVE DELIVERY OF DIGITAL CONTENT ITEMS TO MOBILE DEVICES TO SUPPORT OFFLINE TRANSACTIONS

(75) Inventors: Sunbir Gill, Irvine, CA (US); Matthew A. Jones, Ladera Ranch, CA (US); Yael Peled, Los Angeles, CA (US); Mekka C. Okereke, Irvine, CA (US)

(73) Assignee: Amazon Technologies, Inc., Seattle, WA (US)

(*) Notice: Subject to any disclaimer, the term of this patent is extended or adjusted under 35 U.S.C. 154(b) by 700 days.

(21) Appl. No.: 13/277,553

(22) Filed: Oct. 20, 2011

(51) Int. Cl.
*G06Q 30/00* (2012.01)
*G06F 17/30* (2006.01)
(52) U.S. Cl.
CPC .................................. *G06F 17/30* (2013.01)
(58) Field of Classification Search
CPC ......................................... G06Q 30/06–30/08
USPC ................................................. 705/26.1–27.2
See application file for complete search history.

(56) References Cited

U.S. PATENT DOCUMENTS

| 6,282,542 B1* | 8/2001 | Carneal et al. |
| 7,058,691 B1 | 6/2006 | Yu et al. |
| 7,769,805 B1 | 8/2010 | Barnes et al. |
| 2006/0277271 A1 | 12/2006 | Morse et al. |
| 2008/0200161 A1 | 8/2008 | Morse et al. |
| 2010/0005046 A1* | 1/2010 | Segel .............................. 706/46 |

OTHER PUBLICATIONS

Wang, Prefetching in World Wide Web, Department of Computer Science, University College London, United Kingdom, Aug. 2005.

* cited by examiner

*Primary Examiner* — Ethan D Civan
(74) *Attorney, Agent, or Firm* — Knobbe, Martens, Olson & Bear, LLP

(57) ABSTRACT

A server system that hosts an electronic catalog of digital content items uses behavioral data to predictively select digital content items to proactively deliver to mobile devices of users. The digital content items may, for example, include mobile applications, mobile application components or add-ons, e-books, music tracks, and/or videos. An application component that runs on the mobile devices caches the proactively delivered content items in anticipation that they will be requested by the associated users. In some embodiments, the system supports off-line purchases of cached digital content items such that a user can purchase cached digital content items on the mobile device when no network connection is available.

18 Claims, 8 Drawing Sheets

PREDICTIVE DELIVERY OF DIGITAL CONTENT ITEMS TO MOBILE DEVICES TO SUPPORT OFFLINE TRANSACTIONS

BACKGROUND

Mobile electronic devices such as cellular phones, smartphones, tablets, and e-book readers commonly include functionality for users to purchase digital content items from network sites, and to download such items to their mobile devices. Examples of the types of items that can be purchased and downloaded include mobile applications, application add-ons (such as in-game items and features), application updates, e-books, music tracks, televisions shows, movies, and other videos. Typically, the network sites that support purchases of such items host electronic catalogs that can be browsed interactively from the mobile devices.

In many situations, intermittent or non-existent wireless network connectivity prevents users from purchasing and downloading content items. As one example, a user of a mobile game application that supports in-game purchases of content items may be unable to make any such purchases while flying on an airplane. As another example, a user of an e-book reader may be unable to purchase a desired e-book when no Wi-Fi access exists. Even when an appropriate wireless connection is available, the process of downloading the content item is often time consuming, especially if the item is large.

BRIEF DESCRIPTION OF THE DRAWINGS

The accompanying drawings, which are incorporated in and form a part of this specification, illustrate example embodiments of the inventive subject matter, and in no way limit the scope of protection. The accompanying drawings include examples of possible graphical user interfaces for use with the disclosed system and methods. Other embodiments are contemplated using alternate hardware and/or software platforms, and using significantly different interfaces. The accompanying drawings illustrate embodiments wherein.

DETAILED DESCRIPTION OF SPECIFIC EMBODIMENTS

Various embodiments are disclosed of a system that provides for predictive or proactive transmissions of digital content items to mobile electronic devices. The items may be transferred in the background to the mobile device, and may be cached thereon in anticipation of user requests for such items. In some embodiments, the system also enables the users to conduct off-line transactions, such as offline purchases, of the items cached on their mobile devices. For example, a mobile device user may be provided the option to purchase a mobile application, application component, e-book, music track, video, or other content item while off-line. This option may be provided via a user interface of an application or other component that runs on the mobile device.

Figure 1:
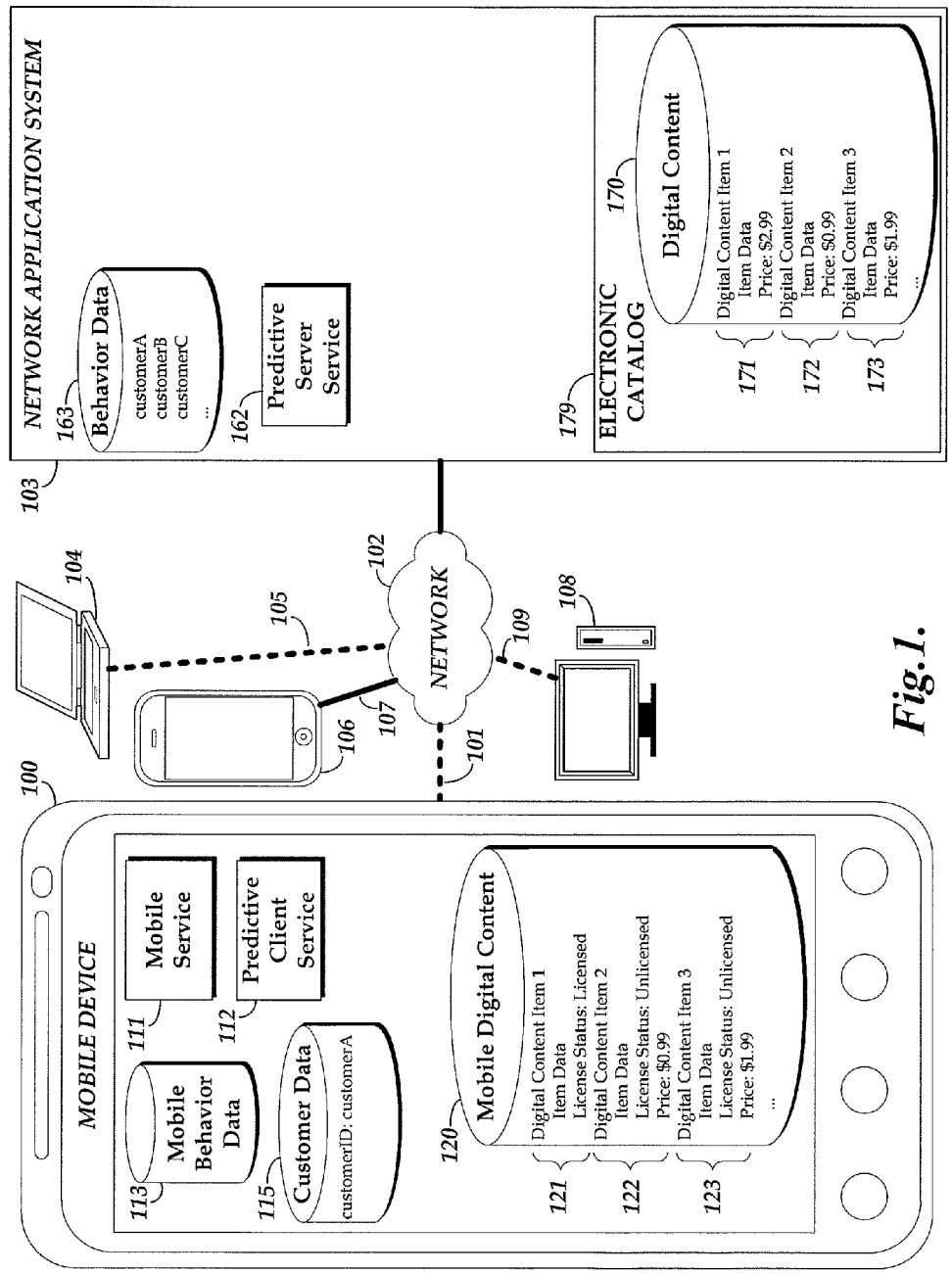
FIG. 1 depicts one embodiment of a system for predictively providing digital content items to a mobile device.

For example, referring to FIG. 1, a network application system 103 is shown, connected by a network 102, to a mobile device 100. The network application system 103 includes an electronic catalog 179 which offers items for purchase. The electronic catalog 179 includes a digital content data store 170, which includes data for digital content items 171-173, such as mobile applications, available for purchase through the network application system 103. The mobile device 100 includes a mobile service 111 which permits the user of the mobile device 100 to purchase the digital content items 171-173 available through the network application system 103. In some situations, once a user has used the mobile service 111 to purchase a digital content item 171, the mobile service 111 will initiate the download of the digital content item 171 to a mobile digital content data store 120 on the mobile device 100, where a local copy of the digital content item 121 will be stored.

The mobile device 100 in the present embodiment also includes a predictive client service 112 which communicates with a mobile behavior data store 113. The mobile behavior data 113 characterizes the behavior of the user of the mobile device 100, such as the frequency with which the user launches certain mobile applications. The predictive client service 112 transmits mobile behavior data 113 to the network application system 103, which may then store the data as behavior data 163 associated with the particular user. The network application system may also store information from other sources of behavior data 163, such as information generated within the network application system 103 concerning the user's purchase history, search history, item ratings, item reviews, item tagging activities, etc.

The network application system 103 includes a predictive delivery service 162 which predicts which of the available digital content items 170 the user may be interested in purchasing or otherwise consuming. The predictive delivery service 162 may then communicate with the predictive client service 112 to cause the mobile device 100 to proactively download such predicted digital content items 122, 123. Local copies of the proactively transferred digital content items 122, 123 are cached in a mobile digital content data store 120 of the mobile device 100. Should the user later decide to purchase or otherwise consume a digital content item that is locally cached, the cached copy may be used without the need to initiate a potentially time consuming download of the item. The user may thereby be granted rapid access to a digital content item, regardless of whether the mobile device has a network connection. Further, in some embodiments, the user may complete off-line purchases of such cached items.

Figure 2:
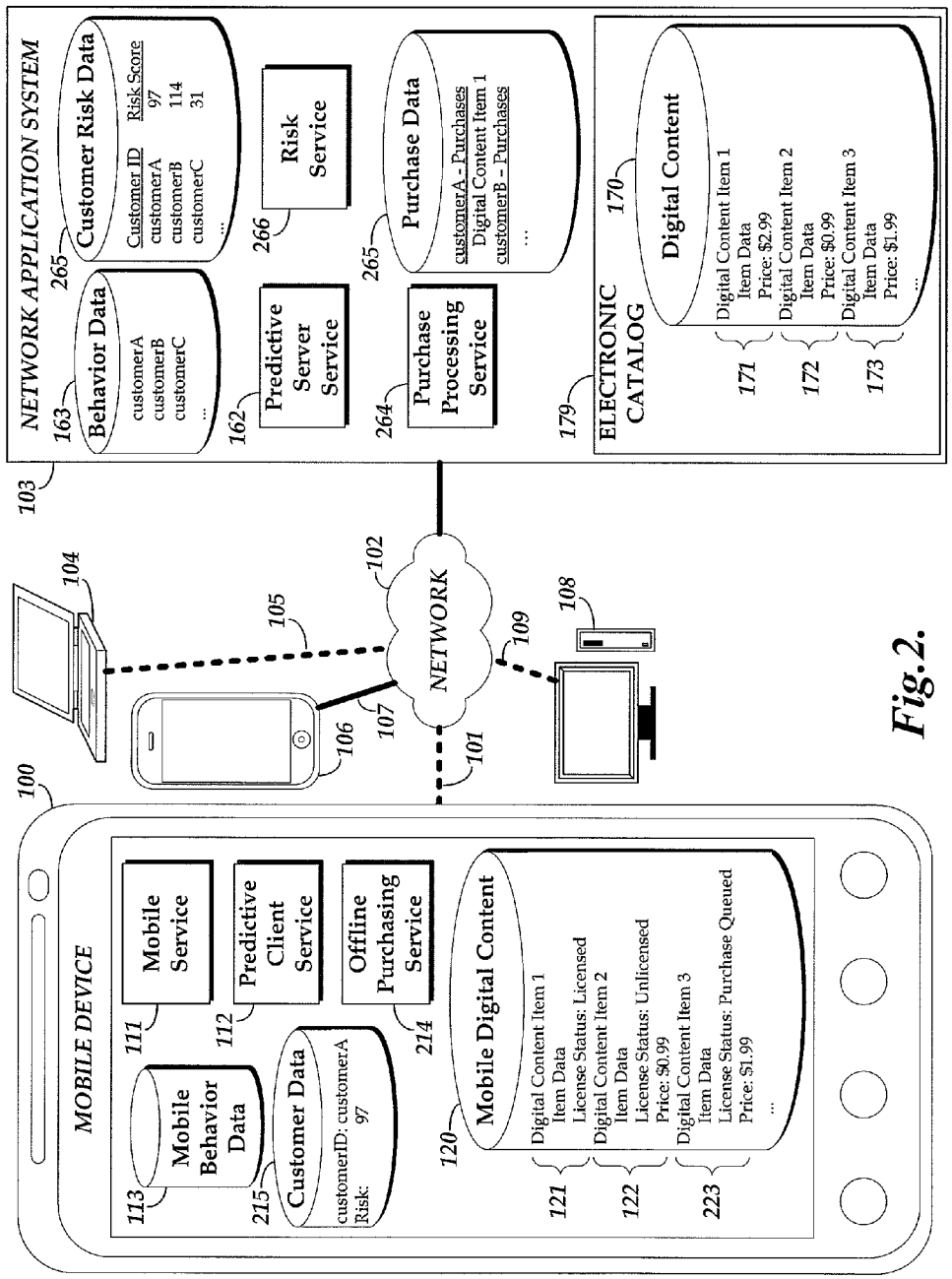
FIG. 2 depicts one embodiment of a system for predictively providing digital content items to a mobile device and allowing risk-based off-line purchasing of the digital content items.

Referring to FIG. 2, an embodiment is illustrated which includes components related to predictive download as well as off-line purchasing. The network application system 103 includes a risk service 266 which generates customer risk data 265 for individual customers. Each customer's risk data corresponds to a determined likelihood that the user will be successful in completing a purchase authorization. In this embodiment, a high risk score indicates a higher risk of a user not successfully completing a purchase authorization, for example by having a credit card authorization attempt declined. In some embodiments, the risk service 266 may be omitted. Further, in some embodiments, the system may provide an option for users to pre-pay for future purchases, in which case off-line purchases may be permitted up to the amount of the user's pre-paid balance.

The mobile device includes an off-line purchasing service 214. The mobile device 100 also includes customer data 215, which may include the customer's risk score or information derived therefrom. Should the user attempt an off-line purchase of a digital content item 223 cached in the mobile device's digital content store 120, the off-line purchasing service 214 may determine if the off-line purchase should be approved based on the customer's risk data 215. If the off-line purchasing service 214 approves the off-line purchase, licensing information for the digital content item 223 is updated to reflect the off-line purchase, and the off-line purchase is queued for transmission to the network application system 103 once a connection 101 is reestablished.

The figures and other examples will next be described in greater detail to further explain various embodiments.

Electronic Network and Devices

In the embodiment of FIG. 1, a mobile electronic device 100 communicates over a network 102 with a network application system 103. In other embodiments, different electronic devices and/or network systems may be used. Examples of mobile devices include smartphones, laptops, tablets, e-book readers, and personal digital assistants. In other embodiments, non-mobile electronic devices, such as desktop computers and/or network-enabled televisions may be used instead of or in addition to a mobile device 100. The depicted embodiment includes other electronic devices 104, 106, 108, some of which are mobile 104, 106.

The illustrated electronic devices are in, or have the ability to be in, communication with an electronic network 102. Certain embodiments may use one or more networks, including but not limited to the Internet, other public networks, private networks, virtual networks, and cellular data networks. FIG. 1 depicts the mobile device connection to the network 102 as a dashed line 101, indicating that the mobile device 100 is not presently connected through that potential connection. For example, the mobile device 100 may connect to the network 102 using one or more of an 802.11 Wi-Fi connection, a 3G or 4G cellular data connection, or some other connection protocol. Similarly, other electronic devices 104, 109 are shown with off-line connections 105, 109. Another electronic device 106 is shown with a solid line 107, indicating that it is presently connected to the network 102. In certain embodiments, a device may be considered to be off-line when it has only a partial connection, and/or when its connection fails to meet certain criteria, such as a minimum bandwidth level.

Mobile Service

The mobile service 111 shown in FIG. 1 is an application or application component designed to run on the mobile device's 100 operating system platform. This service 111 includes a graphical user interface ("GUI") that provides the mobile device user with the ability to obtain digital content items 120, such as through one or more network application systems or sites 103. Examples of mobile services 111 include a mobile application store client, a mobile music store client, an e-book reader application, and a mobile video store client. In other examples, the mobile service is not a store in that it does not require and/or allow the purchase of digital content items 170, instead providing the user with the ability to access and/or download digital content items 170 without purchase. In still other embodiments, a service may be used which is not specific to a mobile device, and may be some other client service, such as software designed to run on a network-enabled television with the ability to download widgets from a network system.

The mobile service 111 or other client service may be written, for example, in any of a variety of programming languages including, but not limited to, Java, JavaScript, HTML5, CSS, C, C++, C#, ASP.NET, and/or Basic. Furthermore, while certain embodiments include a mobile service 111 which provides a GUI, in other embodiments the mobile service provides for one or more other means of user interaction in addition to, or instead of, a GUI—for example, a command-line interface and/or an application programming interface.

Network Application System

In the present embodiment, the mobile service 111 of the user device 100 is configured to communicate with a network application system 103. In this example, the network application system 103 includes one or more physical or virtual servers which allow users to download digital content items 170. For example, the network application system 103 may be a computer server executing a software service designed to provide mobile applications to mobile device users. As another example, some other network system, rather than a network application system, may be used. For example, a network system may be configured to provide video files of television episodes for downloading and local viewing.

The network application system 103 may include software in any of a variety of programming languages, and may communicate with the mobile device 100 using one or more of a variety of protocols, such as the File Transfer Protocol, Hypertext Transfer Protocol, and/or BitTorrent protocol. As illustrated in FIG. 1, the network application system 103 is connected to a network 102. In this example, the network application system 103 is connected to the same network 102 as the mobile device is configured to connect to, and is thereby capable of communicating with the mobile device 100 through that network 102.

Digital Content Items

The network application system 103 of the current embodiment includes an electronic catalog 179. The electronic catalog may store data representing a number of items available to users, such as items which customers may purchase. The network application system 103 may include services which provide for one or more means of interacting with the electronic catalog 179, such as a web-based store front which users' may access through their web browsers, and/or application-specific custom storefront services.

The electronic catalog 179 shown in FIG. 1 includes digital content items 170. One example category of digital content items 170 is applications, which may include cross-platform applications, mobile device applications, and/or other types of applications. Another example category of digital content items 170 is application add-on content, such as files associated with downloadable levels, characters, items, expansion sets, and/or maps for one or more applications. Another example category of digital content items 170 is multimedia, which may include a variety of different types of digital content items, such as songs, albums, photographs, television episodes, movies and/or other videos or other digital multimedia items. The network application system 103 may store data representative of such digital content 170, for example as individual files, as items in a database, as items in a data repository, and/or through some other data storage manner.

The network application 103 of the present embodiment stores information associated with various digital content items. For example, the network application system's 103 digital content data store 170 includes entries for three digital content items: Digital Content Item 1, Digital Content Item 2, and Digital Content Item 3. For Digital Content Item 1, the data store 170 includes multiple types of data 171, such as the item data which represents a copy of the digital content item, and metadata such as pricing information. Here, the network application system 103 stores a copy of Digital Content Item 1 and associated pricing information indicating that copies of Digital Content Item 1 sell for $2.99. Similar information is stored for Digital Content Item 2, 172, and Digital Content Item 3, 173. In other embodiments, price information is not stored as digital content items are provided without purchase, or by subscription which does not require additional per-item purchase. In still other embodiments, additional information, such as metadata indicating licensing information and/or compatibility information is stored and associated with digital content items.

As explained above, the mobile device 100 includes a mobile digital content data store 120 which includes copies of digital content items 121-123 stored on the mobile device. The mobile digital content data store 120 includes metadata associated with digital content items. For example, the mobile digital content data store 120 includes item data for Digital Content Item 1 and includes license status metadata for Digital Content Item 1, 121. The licensing status metadata indicates whether the user of the mobile device 100 has a license to Digital Content Item 1. In some embodiments, licensing may be performed on a device basis. Additionally or alternatively, in some embodiments, licensing may be performed on a user or user account basis. In FIG. 1, the user of the mobile device 100 has used the mobile service 111 to purchase Digital Content Item 1 from the network application system 103. The mobile service 111 then initiated the download of Digital Content Item 1 from the network application system 103 to the mobile device 100, where it was stored in the mobile digital content data store 120.

In certain embodiments, the mobile digital content data store 120 maintains secure copies of the digital content items in order to prevent the user from accessing and/or modifying items which the user does not have privileges to. The mobile digital content data store 120 may include a cached copy of a digital content item to which the user does not have a license to, and the user is therefore not permitted to access. For example, the present embodiment shows Digital Content Item 3 as having a license status of "Unlicensed" 123 on the mobile device 100. In this example, while a copy of Digital Content Item 3 is stored on the mobile device 100, a user of the mobile device 100 will not have access to Digital Content Item 3 until a proper license is obtained. Examples of restricting unauthorized use of digital content items can be found in U.S. patent application Ser. No. 13/170,074, titled "SERVICE FOR ADDING FUNCTIONALITY TO APPLICATIONS," filed Jun. 27, 2011, the contents of which are incorporated by reference herein. Certain embodiments may use Digital Rights Management ("DRM") restrictions, such as those from the Ser. No. 13/170,074 Application, in order to prevent unauthorized access to digital content items stored on an electronic device.

In the present example, the mobile device 100 includes a customer data store 115 which stores data identifying the user of the mobile device 100 as having a customer identification of customerA. In some embodiments, a customer identification may be used in determining whether a user of the mobile device 100 is licensed to use a digital content item.

Predictive Download

The system shown in FIG. 1 provides for proactive downloading of one or more digital content items. In the present embodiment, proactive downloading is based on predicted user behavior. In other embodiments, other factors may be used alternatively or additionally to predicted user behavior. As illustrated, the mobile device 100 includes a mobile behavior data store 113 which stores data gathered on the mobile device concerning the user's behavior. Examples of user behavior for which data may be gathered and stored include the frequency with which a user launches an application, the frequency with which a user uses an application, the number of applications installed on the mobile device, the average amount of additional content for applications or types of applications installed on the mobile device, the amount of time phone calls are made using the mobile device, and/or the amount of bandwidth used by the mobile device. Mobile behavior data 113 may be user-specific and may reference or be referenced by customer data 115. For example, a mobile device 100 may store mobile behavior data 113 for multiple users associated with the mobile device 100. In some embodiments, the behavioral data is alternatively stored on the network application system only 103, and not on the mobile devices 100.

The predictive client service 112 of the present embodiment is in communication with the mobile behavior data 113 and transmits at least some of the mobile behavior data 113 to the network application system 103, where it is stored as behavior data 163 associated with the user's customer identification. The network application system 103 may additionally or alternatively store behavior data 163 which is not received from a mobile device 100. For example, the network application system 103 generate and store behavioral data 163 based on a user's purchases, downloads, searches, item ratings, item viewing activities, and/or other interactions.

The predictive delivery service 162 predictively determines one or more digital content items which one or more users may be interested in downloading and/or purchasing. For example, the predictive delivery service 162 may communicate with the behavior data store 163 and predict a likely purchase for a particular user based on that user's other purchases, and/or based on the frequency with which the user uses certain applications on his mobile device 100. In other scenarios and embodiments, other factors may be considered in addition to or instead these exemplary factors. In some embodiments, the predictive delivery service 162 may make a prediction based on prediction rule data stored within or accessible to the network application system 103. For example, a prediction rule configuration file may indicate that when a user has a particular mobile game application installed on their mobile device, it should be predicted that they may purchase the sequel mobile game application.

Additionally or alternatively, aggregated and analyzed user behavior may affect predicted download interest. For example, the network application system 103 may include an aggregation and analysis service which aggregates individual customers' behavior data 163 and detects trends, correlations, statistics, or other analyses based upon such aggregated data. For example, the aggregation and analysis service may calculate that a statistically significant percentage of users who have purchased the first episode of a popular television series have also purchased the second episode of the television series. The aggregation and analysis service may generate and/or store aggregation and analysis data reflecting this aggregation and analysis. The aggregation and analysis data may be stored in the behavior data store 163, or in some other data store.

In certain embodiments, the predictive delivery service 162 may initiate a proactive download in response to predictively determining that a user is considered likely to be interested in a particular digital content item. For example, the predictive delivery service 162 may initiate a communication with the predictive client service 112 on the mobile device 100 of the user predicted to be interested in the digital content item. The communication may cause the predictive client service 112 to download a copy of the predicted digital content item to the mobile device's 100 mobile digital content data store 120. The downloaded copy may be stored with licensing information and/or digital rights management information indicating that it is not yet licensed.

In another embodiment, the network application system 103 stores data representative of pairings between customers and digital content items which they are predicted to be interested in. In such embodiments, a predictive client service 112 may occasionally query the network application system 103 to determine if there are any such digital content items which it should proactively downloaded, and may download the digital content items identified in response to the query.

In the present embodiment, should the mobile device's user later choose to download and/or purchase a digital content item, the predictive client service 112 on the user's mobile device 100 may first check whether a cached copy of that digital content item is stored on the mobile device 100. In some embodiments, if a locally cached copy is found, the predictive client service 112 may check whether that locally cached copy is the correct and/or most current version of the digital content item. For example, the predictive client service 112 may transmit a version number or hash value, associated with the digital content item, to the network application system 103 and may receive a response indicating whether that version number or hash value corresponds to the correct and/or most current version of the digital content item. If the cached copy is not the correct and/or most current version, in some embodiments a different version will automatically be downloaded. In another embodiment, the user may be prompted concerning the version issue and presented with the option to download a new version, or use the locally cached version.

Certain embodiments may further include a cache cleaning service won the mobile device 100. The cache cleaning service may occasionally remove some locally cached copies of digital content items. For example, the mobile device 100 may include a cache cleaning service which examines mobile digital content 120 and determines whether to delete any digital content items from the mobile device's 100 storage. The cache cleaning service may base such a decision in part on mobile behavior data 113. For example, if the user has recently viewed a catalog listing including the digital content item, the user may still be interested in purchasing the item and it might be decided to continue caching the item as a result. If a digital content item has been cached for a significant amount of time without the user choosing to access and/or purchase the item, it may be removed from the mobile device on that basis. Some such embodiments may also base a decision of whether to remove a cached digital content item at least in part on the amount of storage, or a particular type of storage, available on the mobile device 100. For example, a cache cleaning service may be more likely to remove a locally cached copy of a digital content item if the mobile device's available storage space is below a certain threshold. In some embodiments, the user may also be given an option to view and selectively delete the proactively cached content items.

In some embodiments, the user is presented with one or more configurable settings related to predictive download. For example, the user may be able to enable or disable predictive download, enable or disable a cache cleaning service, set a maximum amount of memory to be used in storing predictively downloaded item, and/or select a sensitivity level for predictive calculations. As one example, a user may be given the option to specify that predictive downloads are to occur only over Wi-Fi connections, and thus only when a Wi-Fi connection is available.

Some embodiments may allow an application developer to choose whether proactive delivery for digital content items will be enabled or disabled for certain applications. For example, an embodiment may include a software development kit (SDK) for mobile application developers. The SDK may allow a developer to turn off proactive delivery of digital content related to a mobile application created using the SDK. An SDK may additionally or alternatively provide other functionality related to proactive delivery, such as allowing a developer to select the amount of digital content to be proactively delivered, or the user attributes to consider when determining what digital content to proactively deliver. The SDK may allow a developer to select only certain digital content items for proactive delivery. In other embodiments, a developer may enable or disable proactive delivery without using an SDK. For example, a developer may be presented with the ability to opt in or out of proactive delivery using a web-based interface when submitting an application to an electronic catalog.

Off-Line Purchasing

In the embodiment of FIG. 2, the mobile device 100 includes an off-line purchasing service 214. In this example, when a user is not connected to the network application system 103, for example due to the mobile device not having an active network connection 101, the user may still be able to purchase digital content items which are locally cached on the mobile device 100. (The term "purchase," as used herein, is intended to cover, but is not limited to, rental and license transactions in which the user pays to access or use the content item but does not necessarily obtain any ownership rights in the content item.) For example, a user of the mobile device may use a mobile device store client application to review and purchase one or more digital content items 170 from the network application system 103. The mobile device store client application may include and/or interact with the off-line purchasing service 214. Examples of mobile device store clients include mobile application store clients, mobile music store clients, mobile movie store clients, and other mobile multimedia store clients. In other embodiments, clients which are not mobile stores are used, such as an application written for a non-mobile platform, or a client application which provides digital content items available for download, but not purchase.

The off-line purchasing service 214 may detect that the mobile device 100 is not connected to the network application system 103 and may present the user with the ability to purchase items which are already cached to the mobile device 100, for example due to proactive download based on a predicted interest. In one embodiment, the user, when online, is only shown items which have been locally cached and are available for off-line purchase. In another embodiment, the user is shown both cached and non-cached items, and may be informed that the cached items are available for off-line purchase.

The off-line purchasing service may store data indicative of a user's off-line purchase. For example, in the present embodiment the mobile digital content data store 120 includes licensing data associated with Digital Content Item 3, 223, which indicates that the user has purchased the digital content item off-line, and that purchase is queued so that it will be processed once the mobile device's 100 connection 101 to the network application system 103 is restored. In another embodiment, a separate data store is used to store queued purchase data associated with off-line purchases.

The network application system 103 of the present embodiment includes a purchase processing service 264. The off-line purchasing service 214 of the mobile device 100 may communicate with the purchase processing service 264 in order to provide information used by the purchase processing service 264 in processing purchases. For example, the purchase processing service 264 may perform payment processing, such as credit card purchase authorization, based on purchase information supplied by the off-line purchasing service 214. Additionally or alternatively, the purchase processing service 264 may provide for purchasing using one or more other types of purchase processing, such as wire transfer, gift card payment, bank account withdrawal, and debit payment. The off-line purchasing service 214 may provide information identifying the customer who completed the purchase, and the item purchased. Additional information, such as the price of the purchase, may also be supplied by the off-line purchasing service. However, in certain embodiments, the price is determined and/or verified by the network application system 103.

The network application system 103 shown in FIG. 1 includes a purchase data store 265 which stores data associated with completed customer purchase. In some embodiments, the network application system 103 will check the purchase data store 265, when a purchase is being processed, in order to verify that the customer has not already purchased the same digital content item. In other embodiments, a user may be permitted to make multiple purchases for the same digital content item.

Figure 3:
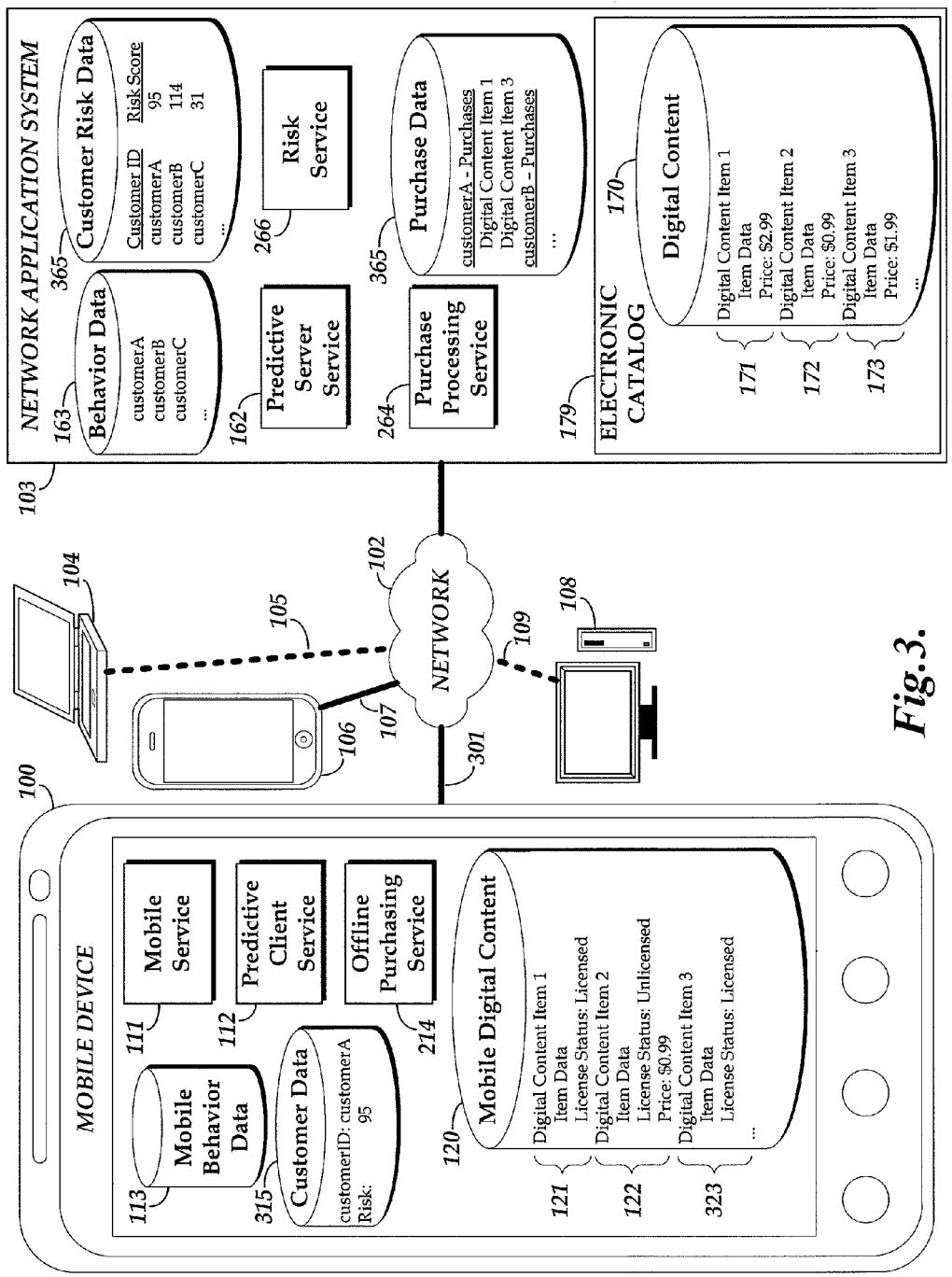
FIG. 3 depicts one embodiment of a system for predictively providing digital content items to mobile applications and allowing risk-based off-line purchasing of the digital content items. As depicted, an off-line purchase of a digital content item has been processed.

Referring to FIG. 3, the embodiment of FIG. 2 is shown after the mobile device's connection 301 has been restored, as indicated by the solid line 301. The off-line purchasing service 214 has detected that the connection 301 was reestablished and has queried the mobile digital content data store 120 to determine if any off-line purchases were queued for processing. Having determined that Digital Content Item 3 has a licensing status of Purchase Queued, the off-line purchasing service 214 communicates the user's customerID, and an identifier of Digital Content Item 3, to the purchase processing service 264.

The purchase processing service 264 of the present embodiment is shown as having received information identifying the off-line purchase completed by customerA of the mobile device 100 while the device was not connected to the network application system 103. The customer account identification may be obtained from the customer data store 315. The purchase processing service 264 subsequently processes the purchase by, for example, posting a charge to the credit card which the user provided during the off-line purchasing process. Such purchasing information may be stored by the mobile device 100 and subsequently transmitted to the network application system 103. In another embodiment, the mobile device stores information identifying payment options, such as particular credit cards, associated with the user's account, and transmits, to the network application system 103, an identifier for the payment option used during the off-line purchase rather than the complete information for that payment option.

Upon successfully authorizing the purchase, the purchase processing service 264 updates the purchase data 365 to indicate that customerA has purchased Digital Content Item 3. The purchase processing service 264 also transmits a confirmation to the off-line purchasing service, indicating that the purchase has been successfully processed. The off-line purchasing service 214 may then update the licensing status stored on the mobile device 100 to indicate that Digital Content Item 3 is licensed. The user may be permitted to access the digital content item which has a licensed status.

Customer Risk

As shown in certain of the figures, some embodiments may provide functionality for risk-based off-line purchase authorization determinations. For example, referring to FIG. 2, the network application system 103 includes a risk service 266 which determines, accesses and updates customer risk information. Customer risk information may indicate the extent to which a customer is considered a risk for having their off-line purchase later fail to authorize once the user's mobile device 100 is reconnected to the network application system 103 and the off-line purchase is processed by the purchase processing service 264. In other embodiments, customer risk relates to some other degree of risk, trust, accountability, credit score, account balance or other metric associated with a purchase. The present embodiment stores data associated with customer risk information as customer risk data 265. As illustrated, each customer's customer identification number is associated with a risk score. In this example, a higher risk score indicates a higher risk that a user may make off-line payments for which payment processing will later fail. In other embodiments, other indicators, grading, or scoring systems may be used.

Figure 4:
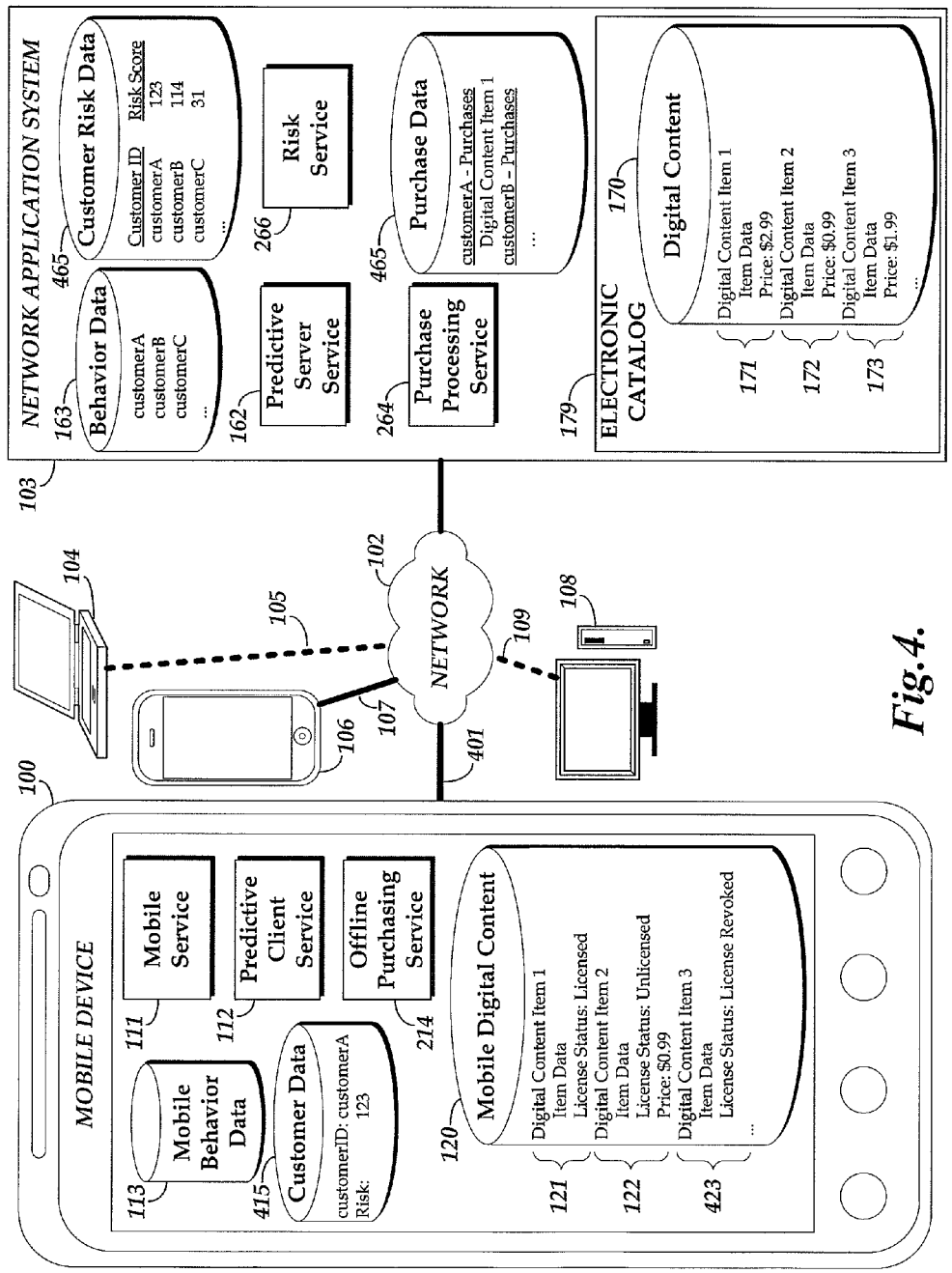
FIG. 4 depicts one embodiment of a system for predictively providing digital content items to mobile applications and allowing risk-based off-line purchasing of the digital content items. As depicted, an off-line purchase of a digital content item has been revoked.

Customer risk data may be created and/or updated based on one or more factors which may indicate a risk or trust level. Examples of such factors success of previous off-line purchases payment authorizations, success of online purchase payment authorizations, number of purchases made, size of purchases made, length of time as a customer, credit score, and other factors. For example, referring to FIG. 3, the user's off-line purchase of Digital Content Item 2 shown in FIG. 2 has been successfully processed by the purchase processing service 264. While in FIG. 2, before the payment processing occurred, the user's risk score was 97 as seen in the customer risk data 265 and customer data 215, FIG. 3 shows the post-success risk score has improved to a lower risk value of 95 also seen in the customer risk data 365 and customer data 315. By comparison, the scenario shown in FIG. 4 represents a user's off-line purchasing failing to receive a successful payment processing by the purchase processing service after the connection 401 is reestablished.

In this case, the user's risk score in the customer risk data 465 and customer data 415 has increased in risk to 123.

The mobile device 100 includes customer risk information associated with the user account of that mobile device. This information is shown as stored in the customer data store 215. In other embodiments, one or more other data stores may be used. In this embodiment, the off-line purchasing service 214 receives customer risk information from the risk service 266 and stores that information as customer data 215. The customer data may be encrypted or otherwise secured so that the user cannot improperly alter the risk score. When the user indicates that he would like to purchase a locally cached item the off-line purchasing service 214 accesses the customer's risk score from the customer data 215. The off-line purchasing service may include some rules which define which risk scores are permitted to make off-line purchases. Examples of such rules include: (1) no customer with a risk score above 100 may complete an off-line purchase, (2) no customer with a risk score above 70 may complete an off-line purchase of an item costing more than $5, (3) no customer with a risk score above 50 may have more than $20 in off-line purchases queued at any time—if this off-line purchase would cause queued purchases to exceed that amount, the off-line purchase should be declined, (4) no customer with a risk score above 40 may complete an off-line purchase of an item costing more than $4 if that item is also consumable and the purchase therefore cannot be revoked, (5) no customer with a risk score above 30 may complete an off-line purchase if the mobile device's GPS indicates that the mobile device is located outside of the United States. Other rules and types of rules, including logical combinations of other rules, may additionally or alternatively be used.

If the off-line purchasing service 214 determines that a user should not be permitted to complete the off-line purchase, the user may be denied access to the locally cached digital content item, and no purchase will be queued for processing. In another embodiment, if the user fails a risk test, the locally cached digital content item may be automatically deleted from the mobile device's mobile digital content data store 120. If the off-line purchasing service 214 determines that the user passes the applicable risk test, the user may be granted a temporary license to the mobile digital content item. That temporary license may indicate that an off-line purchase for the digital content item has been made and is queued for processing once a connection 101 to the network application system 103 has been restored.

In some embodiments, proactive transfers/downloads of content items may be enabled for a particular user or mobile device 100 only after the user has satisfied a selected risk test or criterion. Thereafter, off-line purchases of the proactively transferred items may be enabled without any further assessment of risk.

Revocation

Referring to FIG. 2, the mobile digital content 120 indicates that the user has completed an off-line purchase for Digital Content Item 3, 223, which has a license status of Purchase Queued. As the mobile device 100 still lacks a connection 101 to the network application system 103, the purchase remains queued for some time. Referring to FIG. 4, the embodiment from FIG. 2 continues in this scenario when the mobile device's connection 401 is restored to the network application system 103. The mobile device's 100 off-line purchasing service 214 communicates with the network application system's 103 purchase processing service 264 and transmits information characterizing the off-line purchase. The purchase processing service 264 attempts to process payment for the off-line purchase, however payment is denied and the authorization fails. For example, the user may have entered in an incorrect credit card number, or may have entered in a correct credit card number but funds were not available from that credit card account. The purchase processing service 264 transmits data to the off-line purchasing service 214, that data indicating that the purchase processing has failed. The off-line purchasing service 214 may then alter the licensing information associated with Digital Content Item 3, 423, in order to indicate that the license has been revoked. The user may be restricted and/or fully prevented from accessing Digital Content Item 3's item data when the associated license status indicates such a revocation. The purchase data 465 of the network application system does not include data indicating a purchase by customerA of Digital Content Item 3, because of the failed authorization. In another embodiment, the network application system may store data indicating the failed authorization in a data store. In this embodiment, the risk service 266 increases the customer's risk score 465, 415 in response to the failed purchase and/or revocation.

In some embodiments, revocation is performed differently for different categories of digital content items. For example, digital content items in such embodiments may be categorized in the consumable, non-consumable, or subscription categories. In such an example, a consumable digital content item may be purchased for a limited duration or extent of use, such as a 1-day digital movie rental. Non-consumable items may be purchased for indefinite use, such as purchasing a licensed copy of a mobile application. A subscription digital content item may comprise a recurring delivery of, or providing of access to, component digital content items. For example, a digital magazine subscription digital content item may result in the purchaser being delivered a component digital content item of monthly digital magazine editions. In such embodiments, revocation may be performed differently for different categories of digital content items. For example, revocation of a non-consumable digital content item may entail marking its licensing status as "Revoked" and restricting user access to the digital content item. Revocation of a subscription digital content item may entail preventing the user from receiving further component digital content items associated with the subscription and may also entail restricting access to previously provided component digital content items. Revocation of a consumable digital content item may be handled similarly to that of a non-consumable digital content item if the consumable digital content item has not yet been consumed, but in some embodiments revocation of a consumed digital content item may not occur. In some embodiments, an off-line purchase risk assessment is based at least in part on the category of digital content item being requested for off-line purchase. For example, the system may require a user to have a lower risk score in order to purchase a consumable digital content item as compared to a non-consumable digital content item, because it may be more difficult to revoke the off-line purchase of a consumable content item if the user has already consumed when purchase processing occurs and fails.

In other embodiments, the system further provides for restricting a user's access to a digital content item purchased off-line if the off-line purchase is not authorized by the network application system 103 within a certain period of time. For example, the user may be provided with one week to use the off-line purchased digital content item without reconnecting the mobile device 100 to the network application system 103. After one week, the digital content item's licensing status may be changed to indicate that the off-line purchase has expired. The user may be informed of the expiration of the digital content item off-line purchase, and may be encouraged to connect to the network application system 103 so that an online purchase may be completed. While the digital content item's licensing status is indicated as expired, the mobile service 111 may prevent the user from accessing the digital content item. In some embodiments, the user would be prevented from completing another off-line purchase of the same digital content item if an earlier off-line purchase had expired.

User Interface

Figure 5:
FIG. 5 illustrates an example user interface offering a user the ability to purchase and access mobile application digital content items that have been proactively/predictively delivered to the mobile device.

Referring to FIG. 5, an example user interface for a mobile application providing for predictive downloading is presented. The mobile device 501 includes a mobile application user interface which presents the user with digital content items associated with a mobile application already installed on the user's mobile device 502. A network application service may include data indicating that users of Angry Squirrels are often interested in purchasing the Ninja Squirrel add-on character, which can be obtained through a digital content item purchase and download. The user interface presents the Ninja Squirrel digital content item 510 with an associated price 511, allowing the user to press the price 511 in order to initiate the purchase. The user interface includes a graphical indication 512 that the digital content item has been predictively downloaded so that no further download is required. The user's decision to purchase the item 510 may be affected by this reassurance of virtually instant gratification. The user interface shown also includes a textual explanation 513 that the digital content item is available instantly, without download. This information may be presented to the user whether or not the mobile device 501 is able to connect to the network application system.

The illustrated interface also shows a digital content item for which no purchase is required 520. The graphical 522 and textual 523 indicators of predictive download are shown to the user, who can gain access to the digital content item by pressing the "Free" button 521.

A third digital content item 530 is shown, which is offered to the user for $1.99. However, in this embodiment, this digital content item 530 does not have a local copy cached on the user's mobile device, and the mobile device is not connected to the network application system. The user is not shown the predictive download indicators, and is instead presented with the option to save a purchase 532 for this item until the mobile device is reconnected to the digital content store. In some embodiments, this queued purchase request may be treated similarly to a queued off-line purchase in that it will be stored on the mobile device and transmitted to the network application system for processing once a connection is reestablished. If the purchase associated with that purchase request succeeds, the mobile device may then download the digital content item 530 and the user may be presented with access to the digital content item 530.

The present embodiment also presents the user with information concerning a mobile application 560 which is recommended to the user 550. Similarly to the add-on content for the existing mobile application 502, this recommendation 550 has been proactively downloaded based on a prediction of user interest. The user is presented with indicators of this download 561, 563, and may purchase the digital content item 560 without downloading it, by pressing the price button 561.

Other embodiments may include a variety of different user interfaces. For example, such user interfaces may present the user with the ability to delete locally cached content items, and/or indicate that they are not interested in certain digital content items which they were predicted to be interested in.

Figure 6:
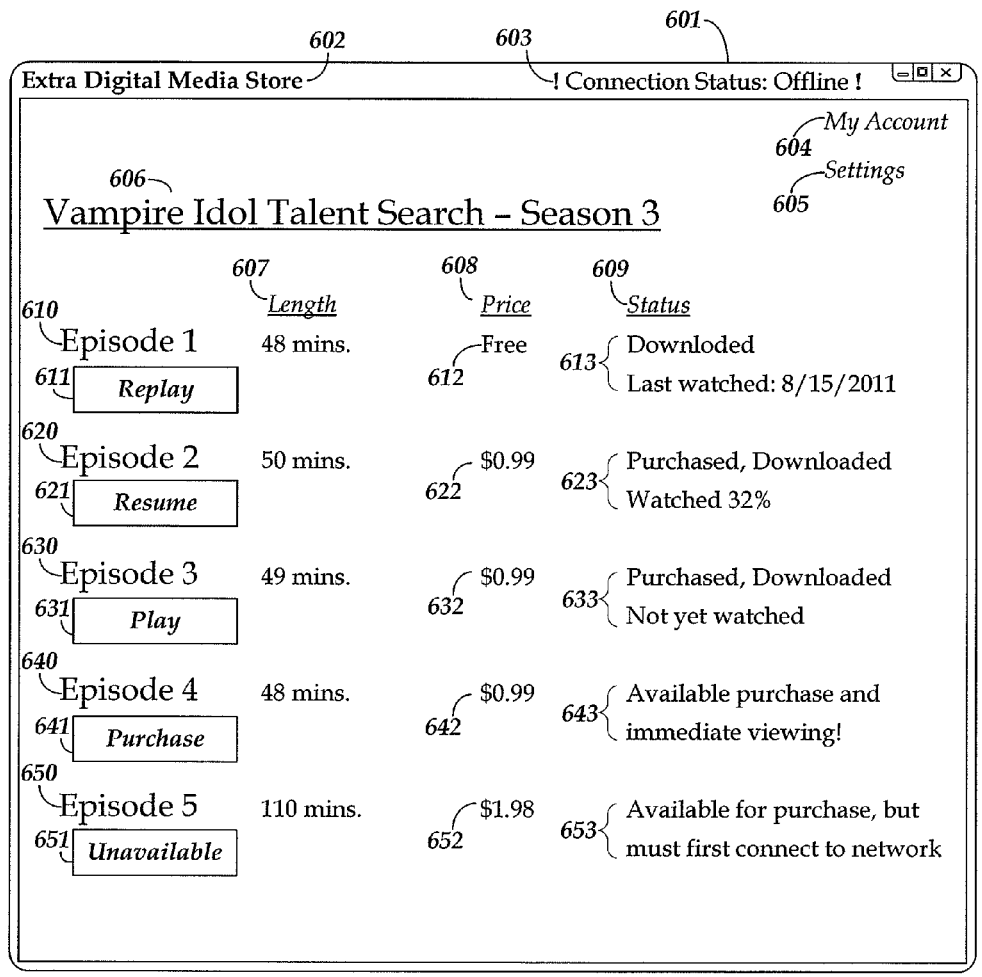
FIG. 6 illustrates an example user interface offering a user the ability to purchase and access multimedia digital content items while off-line.

Referring to FIG. 6, an additional graphical user interface 601 is shown. In this embodiment, a digital media store application 602 allows users to purchase multimedia items, such as television episodes, to their electronic device. The interface indicates that it is not currently connected an associated server 603. The interface indicates that the user is associated with a user account 604 and presents the user with the ability to alter settings 605, such as whether he wishes to have digital content items proactively downloaded to his electronic device, and/or the amount of memory to allow proactively downloaded digital content items to occupy on the device.

The application's interface indicates that digital content items associated with a particular season of a television show 606 are being displayed to the user. References to five episodes are shown 610, 620, 630, 640, 650. The interface presents an action button associated with each episode, the playtime length of the episode 607, the price of the episode 608, and the status of the user's interaction with the episode 609. Episode 1, 610, has a status 613 indicating that it has been downloaded to the device and has been watched. The user is presented with the ability to replay the episode 611. Episode 2, 620, has a status 623 indicating that it has been purchased and downloaded, and that the user has watched a portion of the episode. The associated button 621 allows the user to resume play of the episode where the user last left off. Episode 3, 630, has a status 633 indicating that it has been purchased and downloaded, but the user has not yet begun to watch the episode. An associated button 631 allows the user to begin play of the episode. Episode 4, 640, has a status 643 indicating that it has not been purchased, but that it has been proactively downloaded to the user's device and is therefore available for purchase and immediate viewing, without additional download. The user is presented with a button 641 which triggers an off-line purchase of the episode for the indicated price of $0.99, 642. Episode 5, 650, has a status 653 indicating that it has not been purchased, but has not been proactively downloaded to the user's device, and the user must therefore connect to the network in order to purchase the episode. An indicator 651 confirms that this episode is presently unavailable to the user. The system may have determined to proactively download episode 4 but not episode 5 because episode 4 is the next sequential episode which the user has not yet purchased, but it was not considered sufficient likely that the user would also want to watch episode 5.

Predictive Download Process

Figure 7:
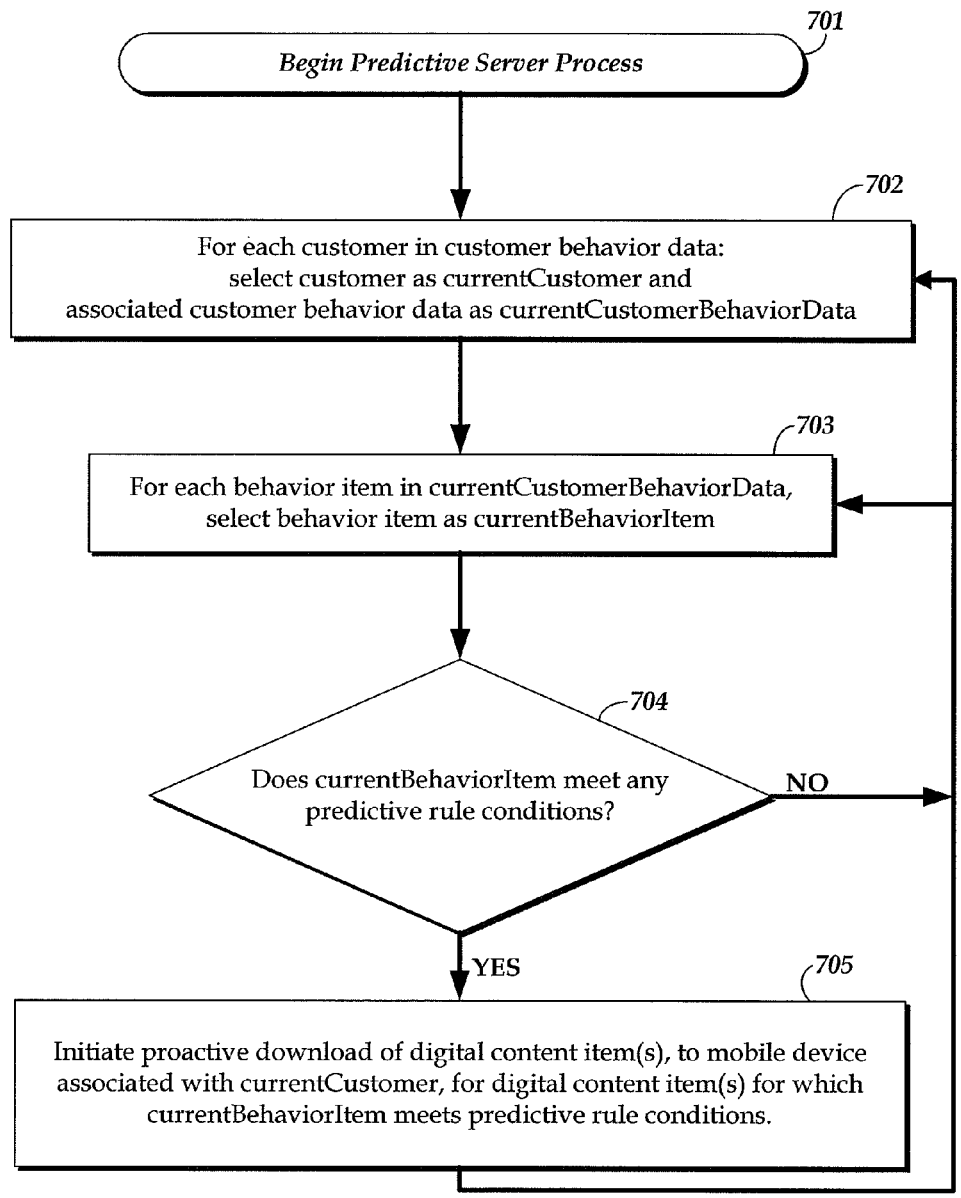
FIG. 7 shows one embodiment of a method for predictively making cached copies of digital content items available to users of mobile devices.

Referring to FIG. 7, an example method is presented for predicting user interest in certain digital content items, and proactively downloading/transferring those digital content items to user devices 100 based on such predictions 701. The process iterates through each customer for which customer behavior data exists, assigning an identifier for the present customer to the currentCustomer variable, and the customer's associated behavior data to the currentCustomerBehaviorData variable 702. The method next iterates through all behavior items stored in the currentBehaviorData set of behavior data, selecting one behavior item at a time, and assigning it to currentBehaviorItem 703. An example of a behavior item may be the customer having purchased the Angry Squirrels application, or having spent more than 5 hours watching episodes of Vampire Idol Talent Search.

For the currentBehaviorItem, the process inquires whether the behavior item meets any rule conditions for an interest prediction 704. For example, the method may access a data store containing rule data indicating that any customer who has watched more than 3 hours of Vampire Idol Talent Search should be proactively provided with the next episode which they have not watched. If no rule conditions are met, the method proceeds to the next behavior item for the current customer. If all behavior items for the current customer have been iterated through, the method proceeds to the next customer. If all customers have been iterated through, the process may begin again and iterate through all customers indefinitely. In another embodiment, when all customers have been iterated through, the process ends. In another embodiment, the process waits an amount of time before resuming iteration.

If one or more rule conditions have been met, the method initiates a proactive download of the digital content item(s) for which the rule condition(s) have been met. One or more mobile devices for the currentCustomer may be instructed to begin download of the digital content item(s).

The task of predictively selecting items to proactively deliver to a mobile device 100 may be performed by the network application system 103, by the mobile device 100, or by both in combination. In some embodiments, an item recommendation engine or service may be used for this purpose. One example of such a recommendation engine/service is disclosed in U.S. Pat. No. 6,912,505, the disclosure of which is hereby incorporated by reference. The proactive transmissions of the selected content items to a mobile device may be initiated by the network application system 103 or by the mobile device 100. As one example, the network application system 103 may send to a mobile device a list of predictively selected digital content items to be proactively delivered; the mobile device/mobile application may thereafter automatically download such content items in the background (e.g., with no visual or other indication to the user that such downloads are occurring) when connectivity and other conditions are met.

Digital Item Purchase Process

Figure 8:
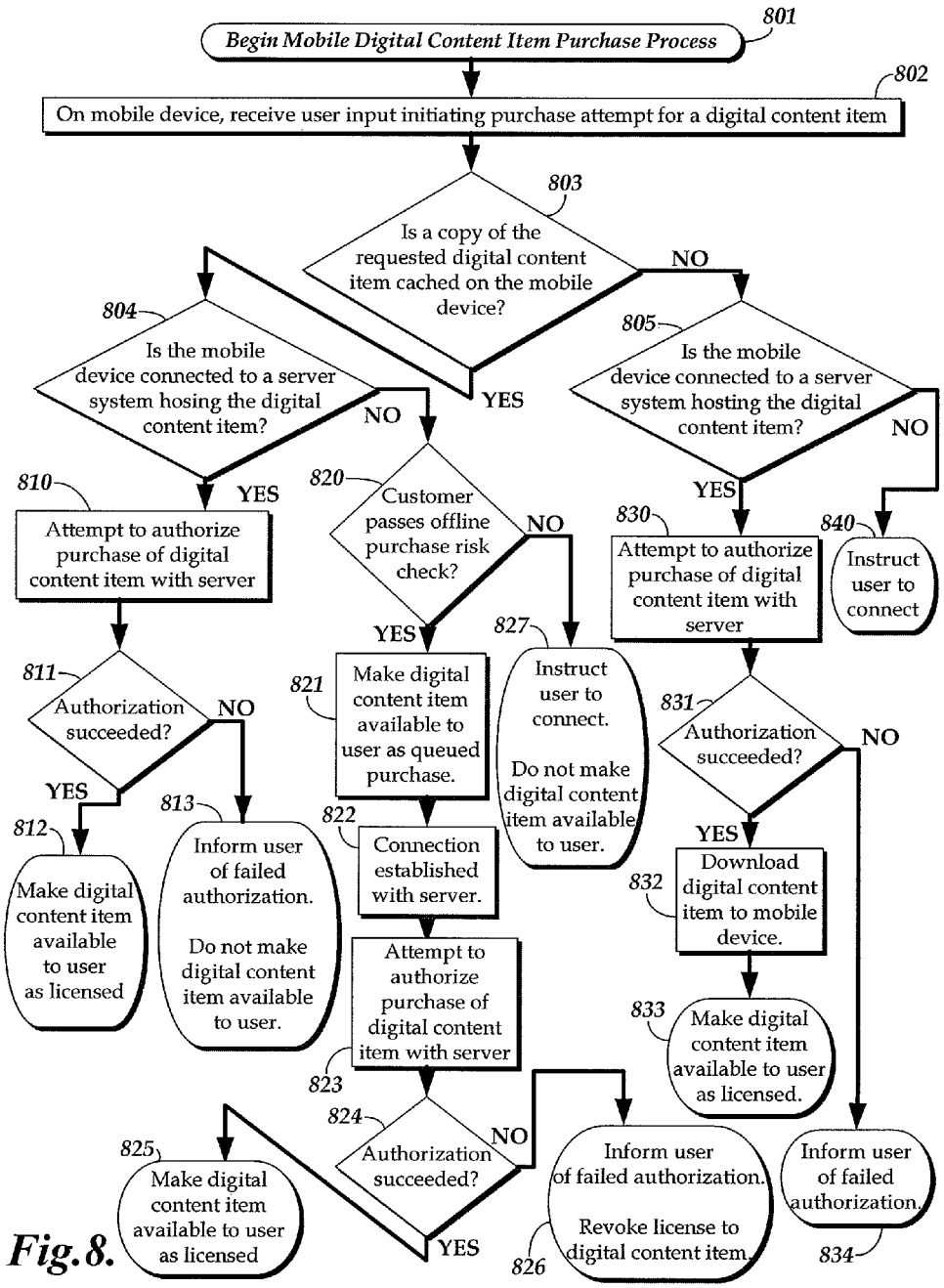
FIG. 8 shows one embodiment of a method for purchasing a digital content item in situations where a user may or may not be connected to an appropriate server system, and the user may or may not have a copy of the digital content item cached on his mobile device.

Referring to FIG. 8, a method is illustrated for downloading and/or purchasing digital content items to a mobile device 801. The mobile device receives user input indicating that the user wishes to purchase a particular digital content item 802. The method determines whether there is a copy of the requested digital content item cached on the mobile device 803. If there is a cached copy, the method next determines whether the mobile device is presently connected to a server system hosting the digital content item 804. In another embodiment, payment processing is handled by a server system that is separate from the server system that hosts the digital content items. In the present embodiment, the exemplary server system serves both functions. If the mobile device is connected to such a server system, the method next attempts to complete an online purchase authorization by authorizing the purchase with the server system 810. The process determines whether the purchase authorization was successful 811. If it was, the digital content item is made available to the user, with the digital content item having a license status of Licensed 812. If the online purchase processing was not successful, the user is informed of the payment failure and the digital content item is not made available to the user 813—for example by having an Unlicensed status.

If the mobile device has a cached local copy of the digital content item, but is not connected to an associated server system, the process may perform an off-line purchase. The process determines whether the customer passes an off-line purchase risk check 820. If the user fails the risk check, the user is instructed to connect to the network so an online purchase can be made 827. In this situation, the digital content item is not made available to the user 827, for example the item may have a status of Unlicensed. If the risk check for the user is successful, the user is considered to have made an off-line purchase and the digital content item is made available to the user for use with a Purchase Queued status 821. When a connection with an appropriate server is reestablished 822, the method proceeds by attempting to process the queued off-line purchase 823. The off-line purchase information is transmitted to the server where a purchase authorization attempt occurs 823. The method determines whether the purchase authorization attempt was successful 824. If it was successful, the digital content item remains available to the user, and its status is updated to Licensed 825. If the purchase processing fails, the user is informed of the failure and the off-line purchase license is revoked, resulting in the user losing access to the digital content item 826.

If there is no local copy of the requested digital content item cached on the user's device, the method inquires whether a connection is available to a server associated with the device 805. If no such connection is available, the user is instructed to connect so an online purchase and download can occur 840. If a connection is available, the method attempts to authorize the online purchase using a purchase authorization with the server system 830. The method next determines if the purchase authorization was successful 831. If the purchase authorization was successful, a download of the digital content item is initiated to the user's device 832, and the digital content item has a status set as licensed 833, with the user granted access to the digital content item. If the online purchase authorization fails, the user is informed of the failure and the digital content item is not downloaded to the user's device 834.

Conclusion

The network application system 103 may be implemented as computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state.

Each of the services depicted and/or described may be implemented in an appropriate combination of computer hardware and software, and/or in application-specific circuitry. For example, each such service may be implemented in service code executed by one or more physical servers or other computing devices. The service code may be stored on non-transitory computer storage devices or media. The various data repositories depicted and/or described may include persistent data storage devices (hard drives, solid state memory, etc.) that store the disclosed data, and may include associated code for managing such data.

Although the inventive subject matter has been described in terms of certain preferred embodiments, other embodiments will be apparent to those of ordinary skilled in the art, including embodiments that do not include all of the features and benefits set forth herein. Accordingly, the invention is defined only by the appended claims. Any manner of software designs, architectures or programming languages can be used in order to implement embodiments of the invention. Components of the invention may be implemented in distributed, cloud-based, and/or web-based manners.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

What is claimed is:

1. A system for enabling users to make off-line purchases of digital content items, comprising:
    a server system that hosts an electronic catalog of items that are available for purchase, including digital content items; and
    a mobile application configured to run on a mobile device of a user, and to provide functionality for the user to purchase digital content items from the electronic catalog;
    said server system configured to proactively deliver digital content items over a network to the mobile device based on predictions that the user will be interested in purchasing such digital content items;
    said mobile application configured to cache the proactively delivered digital content items on the mobile device, and to enable the user to purchase the cached digital content items while the mobile device is off-line, such that the user can purchase the digital content items when no network connection is available between the server system and the mobile device, the mobile application additionally configured to store license status metadata representing license statuses of the proactively delivered digital content items;
    said mobile application responsive to a purchase request by the user for a cached, proactively delivered digital content item, said purchase request occurring while the mobile device has no network connection, by making the digital content item available to the user on the mobile device before the mobile device thereafter establishes a network connection, said mobile application additionally responsive to the mobile device subsequently establishing a network connection by notifying the server system of the purchase request;
    wherein the server system is responsive to being notified by the mobile application of the purchase request by determining, and notifying the mobile application whether, an associated purchase of the proactively delivered digital content item is authorized; and
    wherein the mobile application is responsive to being notified by the server system that the purchase is authorized by updating the license status metadata to reflect a licensed status of the digital content item.

2. The system of claim 1, wherein said mobile application is further configured to (1) determine whether the user is considered sufficiently likely to successfully complete a purchase authorization for one or more digital content items, once a network connection is available between the server system and the mobile device, and (2) permit the user to purchase the one or more digital contents items, while the mobile device is off-line, only when the determination has been affirmatively made.

3. The system of claim 2, wherein said mobile application is further configured to access data representative of whether purchase authorizations for the user's previous purchases were successful, and the determination of whether the user is considered sufficiently likely to successfully complete a purchase authorization is based at least in part on said data.

4. The system of claim 1, wherein said mobile application is further configured to determine that said cached, proactively delivered digital content items should be removed from the cache.

5. The system of claim 4, wherein said determination that said cached, proactively delivered digital content items should be removed from the cache is based on one or more of the following: (1) the amount of free storage space available on the mobile device, (2) the amount of total storage space available on the mobile device, and (3) stored user behavior data.

6. The system of claim 1, wherein said mobile application is a game application, and the digital content item is an item available for purchase within the game application.

7. The system of claim 1, wherein said mobile application is responsive to being notified by the server system that the purchase is not authorized by revoking user access to the digital content item on the mobile device.

8. The system of claim 1, wherein said mobile application is further configured to revoke user access to the digital content item on the mobile device in response to determining that the mobile device has not, within a selected time period following the purchase request, received an authorization of the purchase from the server system.

9. The system of claim 1, wherein said predictions that the user will be interested in purchasing such digital content items are based at least in part on aggregated purchase data of other users of the system.

10. The system of claim 1, wherein said server system is further configured to store data representative of a user's previous purchases, and said predictions that the user will be interested in purchasing such digital content items are based at least in part on the stored data.

11. The system of claim 1, wherein the digital content items are one or more of the following: (1) a mobile application (2) downloadable content for a mobile application (3) a song (4) a movie (5) a television episode, and (6) an electronic book.

12. The system of claim 1, wherein said server system is further configured to send price data, associated with said proactively delivered digital content items, to the mobile device, and said mobile application is further configured to present price information, based on said price data, to the user.

13. A non-transitory computer readable medium having stored thereon a mobile application configured to run on a mobile device of a user, said mobile application configured to interact with a server system that hosts an electronic catalog of items, including digital content items that are available for purchase, said mobile application comprising a user interface for browsing the electronic catalog and purchasing the digital content items, said mobile application configured to cache digital content items proactively delivered over a network to the mobile device by the server system and to store license status metadata indicating license statuses of the digital content items, said mobile application responsive to a purchase request by the user for a cached, proactively delivered digital content item, said purchase request generated while the mobile device is off-line, by making the digital content item available to the user on the mobile device while the mobile device remains off-line, said mobile application additionally responsive to the mobile device subsequently establishing a network connection by notifying the server system of the purchase request and seeking authorization from the server system for an associated purchase of the digital content item, wherein the mobile application is responsive to obtaining said authorization from the server system by updating the license status metadata to reflect a licensed status of the digital content item.

14. The non-transitory computer readable medium of claim 13, wherein the mobile application is responsive to the server system denying authorization for the purchase by revoking user access to the digital content item on the mobile device.

15. The non-transitory computer readable medium of claim 13, wherein the mobile application is a game application that provides functionality for making an in-game purchase of the digital content item.

16. The non-transitory computer readable medium of claim 13, wherein the mobile application is configured to make the cached digital content items available to the user in response to off-line purchase requests based on a determination that the user passes a risk test.

17. The non-transitory computer readable medium of claim 13, wherein the mobile application includes a user interface that displays, for cached digital content items proactively delivered to the mobile device, status indicators indicating that the cached digital content items have been downloaded to the mobile device and are available for purchase.

18. The system of claim 1, wherein the mobile application includes a user interface that displays, for cached digital content items proactively delivered to the mobile device, status indicators indicating that the cached digital content items have been downloaded to the mobile device and are available for purchase.

* * * * *